United States Patent
Patterson

(10) Patent No.: US 8,645,204 B2
(45) Date of Patent: *Feb. 4, 2014

(54) METHOD AND SYSTEM FOR CONDUCTING PROMOTIONAL PROGRAMS

(75) Inventor: Barbara Patterson, South San Francisco, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/909,736

(22) Filed: Oct. 21, 2010

(65) Prior Publication Data

US 2011/0035266 A1 Feb. 10, 2011

Related U.S. Application Data

(63) Continuation of application No. 11/266,766, filed on Nov. 2, 2005.

(51) Int. Cl.
*G06Q 30/00* (2012.01)

(52) U.S. Cl.
USPC ............... 705/14.14; 705/14.24; 705/14.38

(58) Field of Classification Search
USPC ............................... 705/14.14, 14.24, 14.38
See application file for complete search history.

(56) References Cited

U.S. PATENT DOCUMENTS

| | | | |
|---|---|---|---|
| 5,708,422 A | 1/1998 | Blonder et al. | |
| 5,956,695 A | 9/1999 | Carrithers et al. | |
| 5,991,750 A | 11/1999 | Watson | |
| 6,675,153 B1 | 1/2004 | Cook et al. | |
| 6,685,088 B1 | 2/2004 | Royer et al. | |
| 6,722,573 B2 | 4/2004 | Haddad et al. | |
| 7,844,490 B2 | 11/2010 | Patterson | |
| 2002/0026348 A1* | 2/2002 | Fowler et al. | 705/10 |
| 2002/0062279 A1 | 5/2002 | Behrenbrinker et al. | |
| 2002/0138445 A1 | 9/2002 | Laage et al. | |
| 2002/0143626 A1* | 10/2002 | Voltmer et al. | 705/14 |
| 2003/0036998 A1 | 2/2003 | Alliston | |
| 2003/0172040 A1 | 9/2003 | Kemper et al. | |
| 2003/0212595 A1* | 11/2003 | Antonucci | 705/14 |
| 2004/0148224 A1 | 7/2004 | Gauthier et al. | |

FOREIGN PATENT DOCUMENTS

| | | |
|---|---|---|
| JP | 3073990 U | 9/2000 |
| JP | 3073990 U | 12/2000 |

(Continued)

OTHER PUBLICATIONS

Office Action in Russian Patent Application No. 2008121981, filed Oct. 25, 2006.
English Translation of Office Action mailed on Oct. 4, 2011 in counterpart Japanese Application No. 2008-538927, 5 pages.

(Continued)

*Primary Examiner* — John Van Bramer
*Assistant Examiner* — Stacie Gatling
(74) *Attorney, Agent, or Firm* — Kilpatrick Townsend & Stockton LLP

(57) ABSTRACT

A method for using promotional programs and merchant values is disclosed. In one example, the method includes receiving an authorization request message including a merchant verification value through a payment processing network, where the authorization request message is associated with a purchase by a consumer. A merchant-specific promotional program is then determined using the merchant verification value, and the merchant specific promotional program is performed. For example, the promotional program can be a sweepstakes and the task may be determining of the consumer is an instant winner.

21 Claims, 4 Drawing Sheets

(56) References Cited

FOREIGN PATENT DOCUMENTS

| | | | |
|---|---|---|---|
| JP | 2002197382 A | 7/2002 |
| JP | 2002236860 A | 9/2002 |
| JP | 2002269465 S | 9/2002 |
| JP | 2002-329031 A | 11/2002 |
| JP | 2002-373303 A | 12/2002 |
| JP | 2003036481 A | 2/2003 |
| JP | 2003-150849 A | 5/2003 |

OTHER PUBLICATIONS

"Authorization and Authorization Code", Net Industries, http://ecommerce.hostip.info/pages/68/Authorization-Authorization-Code.ht- ml, printed Jul. 15, 2010.

Office Action (English Translation) mailed Jun. 12, 2012 in Japanese Patent Application No. 2008-538927, 3 pages.

Office Action (English Translation) mailed Jul. 23, 2013 in JP 2008-538927, 2 pages.

* cited by examiner

METHOD AND SYSTEM FOR CONDUCTING PROMOTIONAL PROGRAMS

CROSS-REFERENCE TO RELATED APPLICATIONS

This application is a continuation of U.S. patent application Ser. No. 11/266,766 filed Nov. 2, 2005, which is herein incorporated by reference for all purposes.

BACKGROUND OF THE INVENTION

Some conventional systems allow credit card processing companies to uniquely identify types of merchants. Once identified, specialized processing can take place for those merchant types. Such systems focused on the merchant relationships with card issuers, merchant acquirers, or both. The original intent of these relationships was to characterize a transaction for an appropriate interchange fee.

An "interchange fee" is a fee that is paid by an acquirer to an issuer for transactions that are processed. An "interchange" process is the standardized electronic exchange of financial and non-financial data associated with sale and credit data between merchant acquirers and card issuers. The interchange process typically occurs at the end of the day, after all financial transactions for that day have been completed. It is part of the clearing and settlement part of the payment process, as opposed to the authorization part of the payment process. These two parts of the payment process are described in detail below.

Since different types of merchants may sell goods or services of different values and different volumes, different interchange fees may be appropriate for different merchants. In such conventional systems, a transaction processing system may use a merchant identification value to identify the particular type of merchant that is performing a particular transaction and to assign a proper interchange fee to that transaction. For example, restaurants may be entitled to a lower interchange fee than car dealers, since restaurants typically generate more credit and debit card transactions than car dealers. Car dealers may be assigned one identification number and restaurants may be assigned another identification number. The identification number can be used by a central computer to identify the type of merchant associated with a transaction so that an appropriate interchange fee can be applied to the transaction.

Others have described the use of merchant values to distinguish between authorized and unauthorized merchants. For example, U.S. Pat. No. 5,956,695 describes the use of a merchant identification value in an authorization process in a debit card reward redemption process. In the redemption process, a participant may use a debit card at a particular merchant to redeem points and conduct a transaction using those points. At that particular merchant, the merchant identification value may be sent to a filter processor with an authorization request message. The filter processor may then use the merchant identification value to determine if the merchant is an authorized merchant (i.e., one that is participating in the reward redemption process). This is done as a fraud prevention and verification measure.

Although merchant identification values have been used and described in the credit card industry, they have not been used in conjunction with specific merchants and with specific consumers. They have also not been used to provide immediate feedback to a consumer at the point of sale.

It would be desirable to provide for improved systems and methods that can encourage the use of portable consumer devices such as credit cards or debit cards.

SUMMARY OF THE INVENTION

Embodiments of the invention are directed to methods and systems that can use merchant verification values with promotional programs. Such promotional programs may include rewards programs, contests, etc. that can be used to provide incentives to consumers to use electronic forms of payment. Other embodiments of the invention can be directed to methods and systems that can conduct promotional programs such as contests using the authorization process in an electronic payment transaction.

One embodiment of the invention is directed to a method comprising: receiving an authorization request message including a merchant verification value through a payment processing network, wherein the authorization request message is associated with a purchase by a consumer; determining a merchant-specific promotional program using the merchant verification value; and performing the determined merchant specific promotional program after receiving the authorization request message.

Another embodiment of the invention is directed to a computer readable medium comprising: code for receiving an authorization request message including a merchant verification value through a payment processing network, wherein the authorization request message is associated with a purchase by a consumer; code for determining a merchant-specific promotional program using the merchant verification value; and code for performing the determined merchant specific promotional program after receiving the authorization response.

Another embodiment of the invention is directed to a method comprising: receiving an authorization request message, wherein the authorization request message is associated with a purchase by a consumer; after receiving the authorization request message, determining if the consumer is a winner in a contest; and if the consumer is a winner, sending a response message to the consumer, wherein the response message includes an indication that the consumer is a winner.

Another embodiment of the invention is directed to a computer readable medium comprising: code for receiving an authorization request message, wherein the authorization request message is associated with a purchase by a consumer; code for determining if the consumer is a winner in a contest after receiving the authorization request message; and code for sending a response message to the consumer, if the consumer is a winner, wherein the response message includes an indication that the consumer is a winner.

These and other embodiments of the invention are described in further detail below.

DETAILED DESCRIPTION

Figure 1:
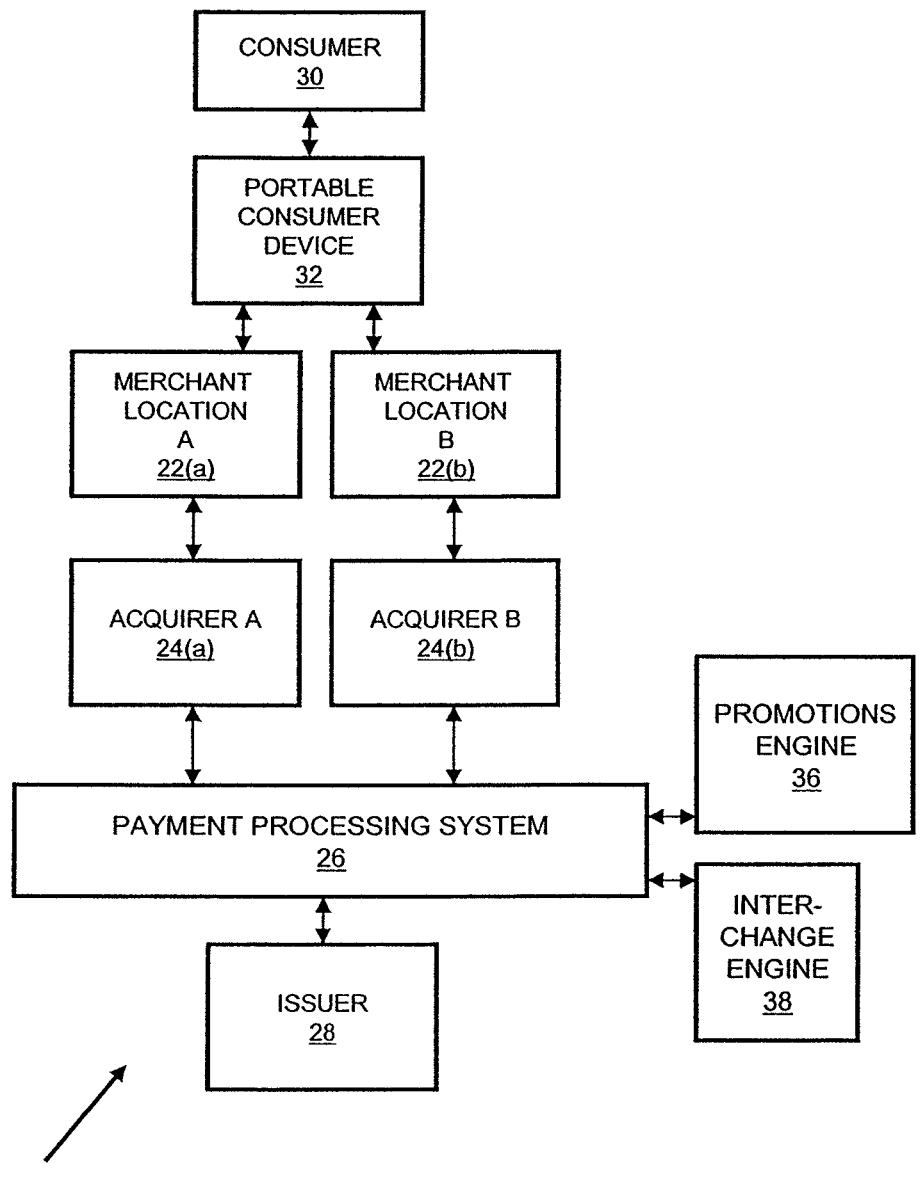
FIG. 1 shows a block diagram of a system including an acquirer, an issuer, and a transaction processing system.

Embodiments of the invention are directed to the use of merchant verification values with merchant-specific promotional programs. In some embodiments, during a process for authorizing an electronic payment transaction, a merchant specific program is determined using a merchant verification value. Once the program is determined, the program is performed and specific feedback is provided to the consumer at the point of sale. For example, a consumer can purchase a good or service at a particular merchant using a portable consumer device. If the portable consumer device is a credit card, the consumer can swipe the credit card through a card terminal. The consumer can then receive immediate feedback regarding what points or rewards have been earned in a particular promotional program associated with that merchant. For example, at the card terminal, the consumer can receive a credit card receipt (or any other type of payment receipt) with an authorization response message. The credit card receipt can have information about what points or rewards the consumer has earned as a result of the purchase.

In embodiments of the invention, an authorization request message is created after a consumer purchases a good or service at a point of sale using a portable consumer device such as a credit or debit card. The authorization request message can be sent from the POS terminal located at a merchant to the merchant's acquirer, to a payment processing system, and then to an issuer. An "authorization request message" can include a request for authorization to conduct an electronic payment transaction. It may include one or more of an account holder's payment account number, currency code, sale amount, merchant transaction stamp, acceptor city, acceptor state/country, etc. An authorization request message may be protected using a secure encryption method—e.g., 128-bit SSL or equivalent—in order to prevent data from being compromised.

Typically, an electronic payment transaction is authorized if the consumer conducting the transaction has sufficient funds or credit to conduct the transaction. Conversely, if there are insufficient funds or credit in the consumer's account, or if the consumer's portable consumer device is on a blacklist (e.g., it is indicated as stolen), then an electronic payment transaction may not be authorized.

An "acquirer" is typically a business entity, e.g., a commercial bank, that has a business relationship with a particular merchant. An "issuer" is typically a business entity (e.g., a bank) which issues a portable consumer device such as a credit or debit card to a consumer. Some entities such as American Express perform both issuer and acquirer functions. Embodiments of the invention encompass such single entity issuer-acquirers.

The authorization request message includes a merchant verification value that is unique to a particular merchant. The merchant verification value can be a numerical value or other value that identifies a particular merchant. It can be used to identify participating merchants in a variety of promotional programs.

The merchant verification value may be in any suitable format. For example, the format characteristic of an exemplary merchant verification value can be as follows:

Positions 1-6 alphanumeric (Hexadecimal 0-9, A-F)—A value registered and assigned by an entity such as a credit card processing entity (e.g., Visa)

Positions 7-10 alphanumeric (Hexadecimal 0-9, A-F)—A value defined in concert with the merchants to uniquely identify specific locations.

As noted above, the merchant verification value can be used in the authorization process and/or clearing process in embodiments of the invention. In embodiments of the invention, a merchant configuration file can be used. Transactions that carry the merchant verification value can be validated against this file for valid values and processing attributes. The merchant configuration file may be stored in a database accessible, for example, to a payment processing system or an issuer. Processing attributes in the merchant configuration file can define specialized merchant processing. Special codes can be used to determine the specific promotional programs associated with entities such as merchants and/or issuers.

A unique characteristic of the merchant verification value is that it is common to the merchant regardless of the merchant's processing relationships with its various acquirers. A merchant may have many locations, and the locations may use different acquirers or acquirer processors. These entities can use a single merchant verification value to identify any unique processing. Previously, a merchant was uniquely known only to its specific acquirer processor using terminal identification values, but was not known uniquely across the payment chain. In addition, because one can identify a merchant through a number in embodiments of the invention, the merchant verification value can be used with different promotional programs. Also, the merchant verification value does not require on-going maintenance. The same basic value can be used for all terminal locations as it does not vary like the terminal identification value.

A "merchant" in embodiments of the invention can have any suitable characteristics. A merchant may include entities such as corporations, sole proprietorships, non-profit organizations, or a specific group of such entities. A specific group of entities might be two cooperating organizations (e.g., two corporations) that cooperate to form and/or run a promotional program. For example, a fast food restaurant and a movie studio may form and/or run a promotional program that benefits both of their businesses. The merchant may also have one or more retail locations at a variety of geographic locations. Using the merchant verification value, a promotional program specific to a particular merchant may be performed for the merchant's customers, even though the merchant may have a number of different retail locations around the country or around the world, and even though the merchant allows for purchases through physical retail locations and/or the Internet. Examples of merchants include grocery stores, clothing retailers, car dealerships, department stores, etc.

After an authorization request message including the merchant-specific value is received (e.g., by a payment processing system or issuer), a merchant-specific promotional program is then determined using the merchant verification value. The merchant-specific promotional program may have any suitable characteristics. Examples of merchant-specific promotional programs include rewards programs, sweepstakes, targeted advertising programs, points, contests, etc. The programs may apply to some or all transactions conducted by a merchant. For example, the programs may provide consumers with discounts on some or all future purchases at the merchant locations. The program may also apply to all or a subset of merchant locations in some embodiments. Thus, the program may be national or regional in scope.

Once determined, the merchant-specific promotional program is performed. The receipt of the authorization request message and the performance of the promotional program can be performed by any entity and/or computational apparatus within the payment system. For example, an acquirer, an issuer, and/or a payment processing system may receive the authorization request message and/or perform the promotional program. In some embodiments, a promotions engine that is accessible to the acquirer, issuer, or the payment processing system may perform the promotion program using appropriate computer code.

Any suitable task may be performed in conjunction with the merchant-specific program. The specific task may relate to the promotional program. For example, the task may include determining what type (if any) of reward or award is to be provided to the consumer, updating consumer account records to account for any rewards or awards, and/or sending an authorization response message back to the POS terminal. An "authorization response message" includes a message that includes information regarding whether or not an electronic payment transaction is authorized. The authorization response message may include information about what rewards the consumer has obtained as a result of the current purchase, whether or not the consumer is an instant winner, how many points the user has earned because of the purchase, etc.

Illustratively, the promotional program may be an instant sweepstakes program that is operated by or initiated by a national clothing retailer such as the Gap™. The sweepstakes program can provide a prize of $1000 for a consumer that purchases goods from that retailer. The winner may be selected at random and the chances of winning may be, for example, 1 in 1,000,000. A central computer in a payment processing system can receive authorization request messages from different branches of the clothing retailer across the country as well as other merchants. Authorization request messages from the clothing retailer can be identified by the central computer using the retailer's merchant verification value. Each time an authorization request message for the clothing retailer is received, the central computer can access a promotions engine, and can determine if the consumer who originated the authorization request message is a winner. This determination as to whether or not the consumer is a winner can then be sent in an authorization response message from the payment processing system, through the acquirer, through the merchant, and to the POS terminal. At the POS terminal, the consumer can be notified if he or she is a winner. For example, a credit or debit card receipt can be printed out for the consumer at the POS terminal. The receipt may have a message such as "try again" or "winner" printed on it.

As noted above, the merchant verification value is used in the authorization part of the payment process. It may also optionally be used in the clearing and settlement part of the payment process (as described below). As background, an electronic payment can be separated into two parts: an authorization process, and a clearing and settlement process. The authorization process occurs in substantially real time (e.g., in a few seconds, such as less than 10 seconds) when a consumer purchases a good or service at a point of sale, while the clearing and settlement process occurs later. In the authorization process, a payment processing system checks the consumer's line of credit or funds in the consumer's account, and relays this information back to the merchant to inform the merchant and the consumer as to whether or not the consumer has sufficient credit or funds to conduct the desired transaction. In the clearing and settlement process, the payment processing system consolidates various transactions between different acquirers and issuers and settles accounts among them. Actual funds can be transferred during the clearing and settlement process. (Note that the clearing and settlement process may be take place in two steps or may take place in a single step like the process that is performed by Interlink). This process is usually completed within two or three days from the date that a purchase is made by a consumer. The consumer is then subsequently billed for the purchase in a periodic statement of the consumer's account.

FIG. 1 shows a system 20 that can be used in an embodiment of the invention. The system 20 includes merchant locations 22(a), 22(b) and acquirers 24(a), 24(b) associated with those merchant locations 22(a), 22(b). The different merchant locations 22(a), 22(b) may be affiliated with a single merchant. A consumer 30 may purchase goods or services at the merchant locations 22(a), 22(b) using a portable consumer device 32. The acquirers 24(a), 24(b) can communicate with an issuer 28 via a payment processing system 26. The payment processing system 26 may communicate with a promotions engine 30 and an interchange engine 32.

The portable consumer devices 32 according to embodiments of the invention may be in any suitable form. For example, the portable consumer devices can be hand-held and compact so that they can fit into a consumer's wallet and/or pocket (e.g., pocket-sized). For example, the portable consumer devices may include smart cards, ordinary credit or debit cards (with a magnetic strip and without a microprocessor), a keychain device (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, and the like. The portable consumer devices 32 can also be debit devices (e.g., a debit card), credit devices (e.g., a credit card), or stored value devices (e.g., a stored value card).

The payment processing system 26 may include data processing subsystems, networks, and operations used to support and deliver authorization services, exception file services, and clearing and settlement services. An exemplary payment processing system VisaNet™, in particular, includes a VIP system (Visa Integrated Payments system) which processes authorization requests and a Base II system which performs clearing and settlement services.

The payment processing system 26 may include a server computer. A server computer is typically a powerful computer or cluster of computers. For example, the server computer can be a large mainframe, a minicomputer cluster, or a group of servers functioning as a unit. In one example, the server computer may be a database server coupled to a web server. The payment processing system 26 may use any suitable wired or wireless network, including the Internet.

The merchant locations 22(a), 22(b) also have point of sale (POS) terminals (not shown) that can interact with the portable consumer devices 32. Any suitable point of sale terminal may be used including card readers. The card readers may include any suitable contact or contactless mode of operation. For example, exemplary card readers can include RF (radio frequency) antennas, magnetic stripe readers, etc. to interact with the portable consumer devices 32.

Two software engines are shown in FIG. 1. They include a promotions engine 36 and an interchange engine 38. Various other software engines may also be included in the system to perform the methods according to embodiments of the invention. Such software engines can be accessible to the issuer 28, payment processing system 26, or the acquirers 24(a), 24(b). Although the two software engines 36, 38 are shown as being directly accessible to the payment processing system 26, they may also or alternatively be directly accessible to the acquirers 24(a), 24(b) or the issuer 28.

The promotions engine 36 may contain or store the various promotional programs operated or initiated by the merchant. The promotions engine 30 may also contain computer code for: storing promotional programs from one or more merchants, identifying a particular promotional program associated with a particular authorization request message or transaction, performing tasks associated with the promotional programs, etc.

The interchange engine 38 may use the merchant verification value to perform interchange processing (as described above). Details of a suitable interchange process using the merchant verification value are described below with reference to FIG. 4.

The engines 30, 32 and any other software components or functions described in this application, may be implemented as software code to be executed by a processor using any suitable computer language such as, for example, Java, C++ or Perl using, for example, conventional or object-oriented techniques. For example, any of the specific steps (or combination of steps) shown in FIG. 2 and FIG. 4 in the present application may be embodied as computer code on a computer readable medium in any suitable combination. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

Figure 2:
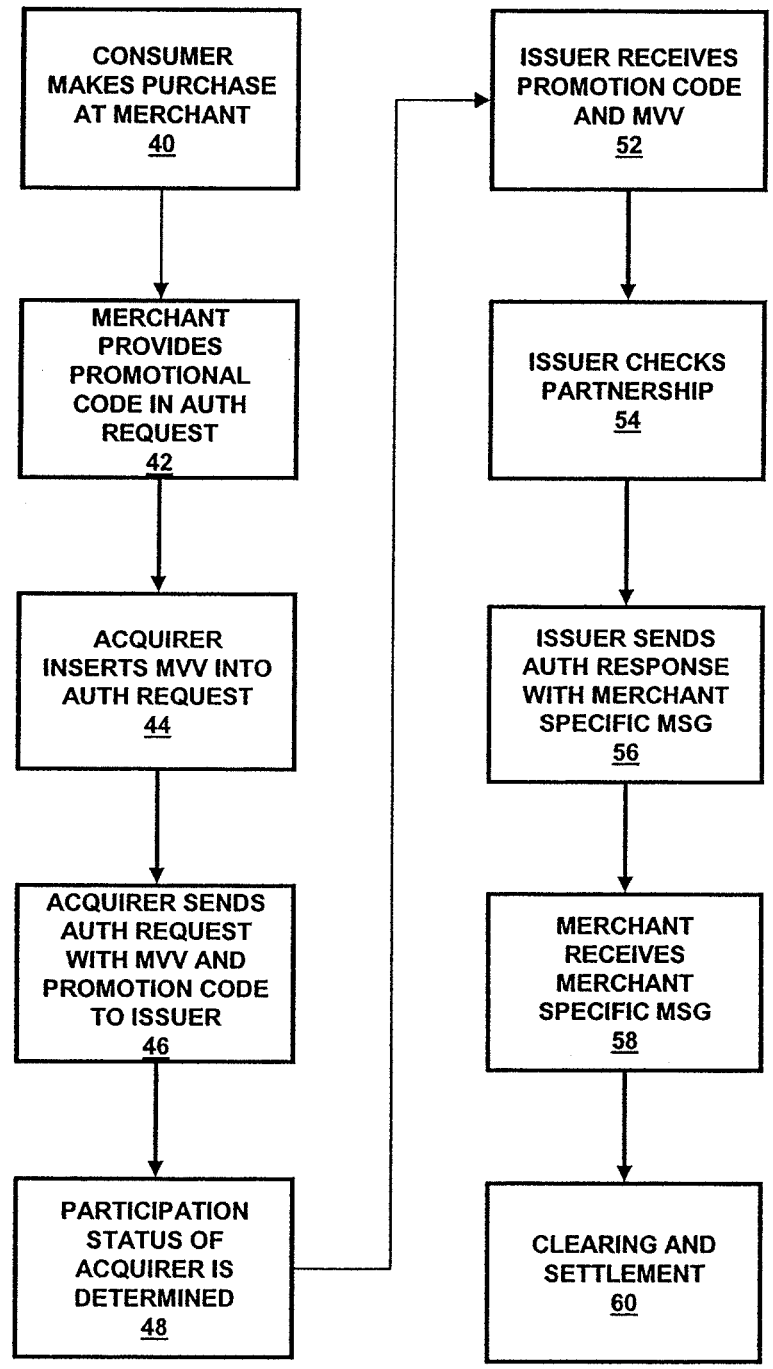
FIG. 2 shows a flowchart illustrating a method according to an embodiment of the invention.

FIG. 2 shows a flow chart of a method according to an embodiment of the invention. The method shown in FIG. 2 can be described with reference to the block diagram in FIG. 1. First, a consumer 30 purchases a good or service at a merchant location 22(*a*) using a portable consumer device 32 such as a credit card (step 40). The consumer's portable consumer device 32 can interact with a POS (point of sale) terminal (not shown) at the merchant location 22(*a*). For example, the consumer 30 may take a credit card and may swipe it through an appropriate slot in the POS terminal.

The POS terminal or a computer operated at the merchant location 22(*a*) may then optionally provide a promotion code in the authorization request message (step 42) so that the merchant's promotion can be identified. The promotion code can be associated with a promotional program which is implemented as a set of instructions residing on or accessible to a promotions engine 36. The insertion of the promotion code may alternatively or additionally occur at the acquirer 24(*a*), the payment processing system 26, or the issuer 28.

The authorization request message is then forwarded to the acquirer 24(*a*) with the promotion code. After receiving the authorization request message, the acquirer 24(*a*) may then insert a merchant verification value into the authorization request message (step 44) and the authorization request message is then sent to the payment processing system 26. Alternatively, the merchant verification value may be inserted into the authorization request by the merchant 22(*a*) or the payment processing system 26. For example, instead of a numerical merchant verification value, a text message identifying the merchant (e.g., "the Gap") or POS terminal ID may be sent from the merchant location 22(*a*) to the payment processing system 26. The payment processing system 26 may then have a lookup table that correlates the text message or the POS terminal ID to a merchant verification value.

The payment processing system 36 then determines the participation status of the merchant and the issuer 28 (step 48). The payment processing system 36 may then access the promotions engine 36 to perform the steps in the merchant's promotional program. For example, the promotions engine 36 may have computer code to provide a 10% discount for every five purchases at that merchant by the consumer 30. The promotions engine 36 may keep track of the consumer's purchases at that merchant. In other embodiments, the payment processing system 26 may not access the promotions engine 36. For example, in some embodiments, the issuer 28 may access the promotions engine 36 to perform the promotion.

The payment processing system 26 then forwards the authorization request message including the promotion code and the merchant verification value to the issuer 28 (step 52). If the promotional program has already been performed by the payment processing system 26, then information about the result of that program may be forwarded to the issuer 28. For example, if the payment processing system 26 previously determined that the consumer 30 is entitled to a discount on the current purchase, then that information may be forwarded to the issuer 28 so that the issuer 28 has a record of the promotional discount and the consumer's account can be adjusted accordingly. If the promotional program has not been performed by the payment processing system 26, then the issuer 28 may access the promotions engine 36 and may perform the promotional program. In any event, the issuer 28 then checks for merchant-issuer partnership participation (step 54). After the issuer 28 checks for partnership participation, the issuer 28 sends an authorization response message back to the payment processing system 26 (step 56) to indicate that the current transaction is authorized (or not authorized).

The authorization message can include a promotion code, response information regarding the current promotion (e.g., "you are a winner", "this purchase is entitled to a 10% discount", etc.), as well as the authorization code for the current purchase (indicating that the purchase transaction is authorized). The transaction processing system 26 then forwards the authorization response message back to the acquirer 24(*a*). The acquirer 24(*a*) then sends the response message back to the merchant 22(*a*). If desired, the transaction processing system 26 and/or the acquirer 24(*a*) may send promotion response information back to the consumer 30 via the authorization response message.

After the merchant 22(*a*) receives the merchant specific message (step 58), the POS terminal at the merchant 22(*a*) may then provide the authorization response message for the consumer 30. The response message may be displayed by the POS terminal, or may be printed out on a credit card receipt.

At the end of the day, a normal clearing and settlement process can take place (step 60). The merchant may provide the promotion code in a merchant deposit file which is to be forwarded to the acquirer 24(*a*). The merchant deposit file contains information regarding the current day's electronic transactions. The acquirer 24(*a*) may send an interchange file to the payment processing system 26 along with appropriate promotional codes. Appropriate transactions may be processed for appropriate interchange fees (described in further detail below). Appropriate promotional codes and transactions details are then forwarded from the payment processing system 26 to the issuer 28. The issuer 28 may then adjust the consumer's account as appropriate. For example, if the consumer 30 has earned points, miles, or other rewards as a result of the current purchase, the issuer 28 can make appropriate changes to the consumer's account.

Figure 3:
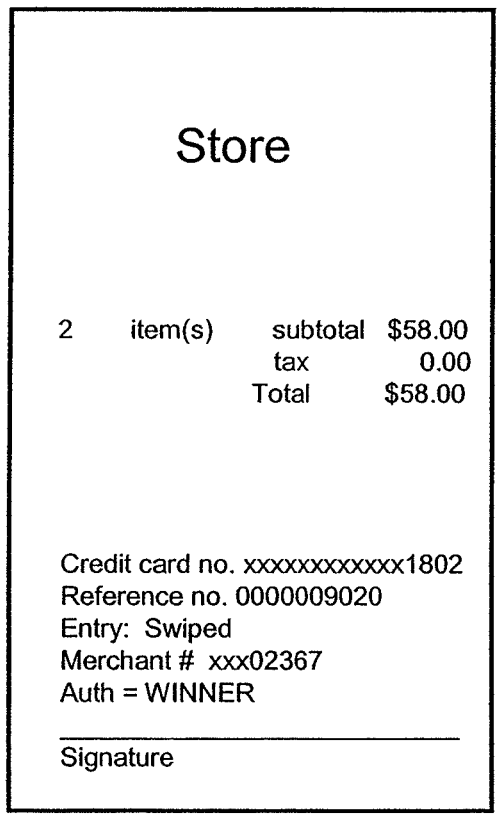
FIG. 3 shows an example of a credit card receipt that is printed with an indication that the consumer is a winner.

As illustrated by the embodiment described above, preferred embodiments of the invention can be directed to contests (e.g., sweepstakes) that provide a consumer with direct feedback during the authorization process. Such contests can be promotional programs and can be performed in the authorization process for an electronic commercial transaction. In a preferred embodiment, an authorization request message optionally including a merchant verification value is received by a computational apparatus such as a server computer. The authorization request message is associated with a purchase by a consumer using a portable consumer device. After receiving the authorization request message, the computational apparatus can determine if the consumer is a winner in a contest. If the consumer is a winner, an authorization response message is sent to the consumer, wherein the response message includes an indication that the consumer is a winner. Optionally, if the consumer is not a winner, an appropriate message (e.g., "try again") may be sent to the consumer. An example of an exemplary credit card receipt is shown in FIG. 3. As shown, the credit card receipt has the word "WINNER" in the authorization field. The word WINNER conveniently has six letters and can correspond to the six digits of a normal authorization code.

In the exemplary contest embodiments (and other embodiments), it is desirable to determine if the consumer's transaction is first authorized, before a message is sent to the consumer indicating that the consumer is a winner. In such embodiments (referring to FIG. 1), an authorization request message may be sent from the merchant location 22(a), to the acquirer 24(a), to the payment processing system 26, and then to the issuer 28. The issuer 28 checks the consumer's account to determine if the current transaction is authorized. If it is, then an authorization response message is sent from the issuer 28 to the payment processing system 26. The payment processing system 26 can then insert a specific value into data field no. 38 (i.e., the standard field for an authorization code response) and override the issuer's normal authorization response. For example, the specific value may be the text message "winner" instead of a normal six-digit authorization code. The payment processing system 26 may then send this modified authorization message to the merchant location 22(a) and then to the consumer 30. The payment processing system 26 may also send information regarding the consumer's "winner" status to the issuer 28 so that the issuer 28 has a record of this and can modify the consumer's account accordingly. The steps in this exemplary process may be combined in any suitable manner with the steps in the process described with respect to FIG. 2.

In these contest embodiments, a merchant verification value may or may not be incorporated into an authorization request message. For example, it is possible to use the identification number of a terminal to identify a particular merchant that is sponsoring the contest. As another alternative, an issuer may be the sponsor of a contest to increase the usage of portable consumer devices issued by that issuer. In this case, a merchant verification value that is used to specifically identify a particular merchant may not be necessary since the potential participants in the contest would be specifically affiliated with the issuer and not with a particular merchant.

In the past, companies have used contests as promotional programs. However, such conventional programs have not provided consumers with immediate feedback regarding whether or not they are winners. For example, one conventional program automatically registered a consumer in a contest when the consumer used a credit card in a commercial transaction. However, the determination of whether or not the consumer was a winner was made long after the commercial transaction concluded (e.g., weeks). If a consumer was a winner, the consumer was notified later (e.g., by mail) that the consumer was a winner. While such conventional programs can be used, they are not satisfying to the consumer, because the time between the consumer's purchase and notification of the results of any such promotional program is too long.

Figure 4:
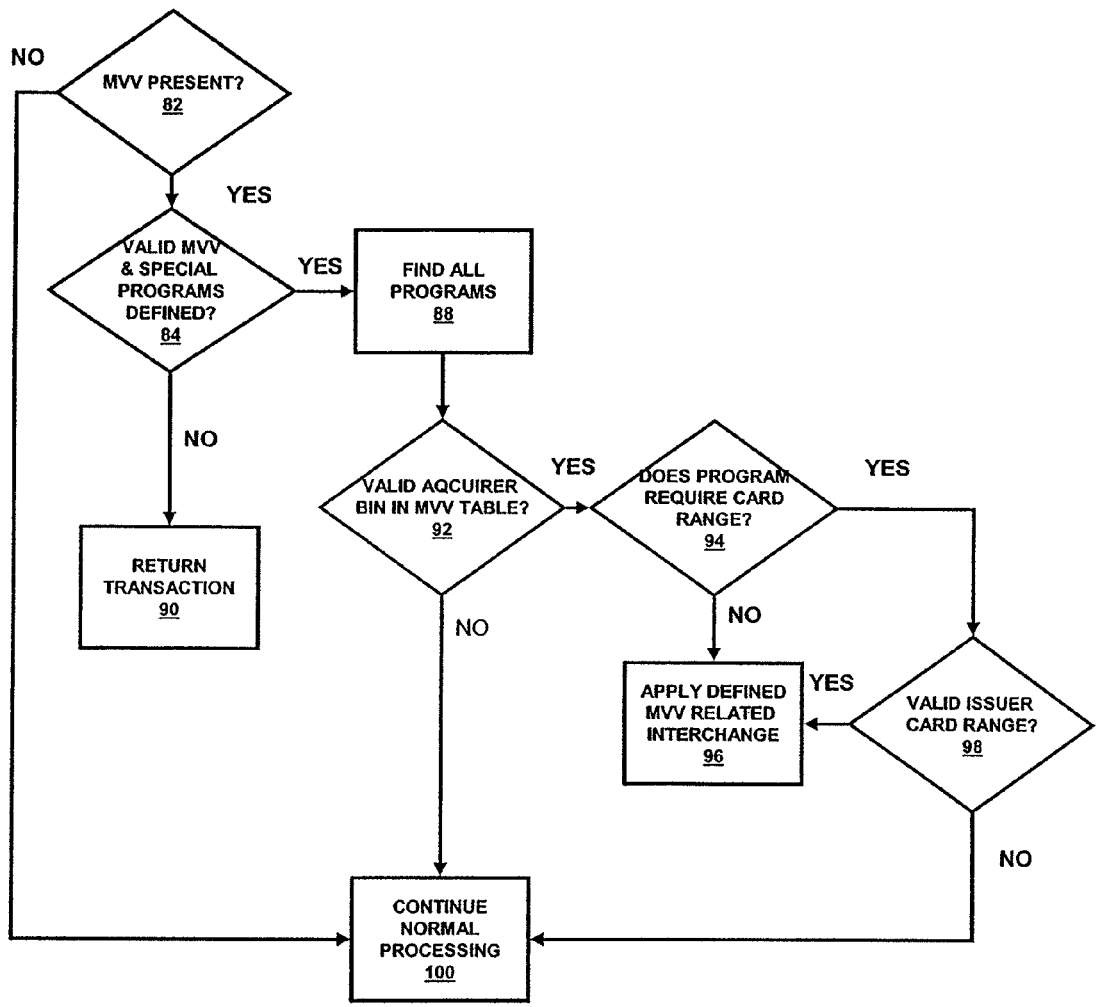
FIG. 4 shows a flowchart showing an interchange process that can be used in an embodiment of the invention.

The merchant verification value according to embodiments of the invention can also be used in the clearing and settlement process, in addition to the authorization process. FIG. 4 shows a flowchart illustrating an exemplary interchange process that uses the merchant verification value.

Referring to FIG. 4, a payment processing system can determine if a merchant verification value is present in a transaction (step 82). Then, the payment processing system can determine if the merchant verification value is valid and if special programs are defined (step 84). If the answer to either of these questions is no, then the transaction is returned (step 90). If the answer to these questions is yes, then all clearing and settlement-related programs are determined (step 88).

It is then determined if a valid acquirer BIN (bank identification number) is present in the merchant verification value table (step 92). If it is valid, then it is determined if the program requires a particular card range (step 94). If it is not valid, normal processing takes place (step 100). As noted above, different interchange fees may be provided for different types of merchants.

If the program does require a card range, then a decision is made as to whether or not the issuer card range is valid (step 98). If it is valid, then a defined merchant verification value interchange is applied (step 96). If it is not valid, then normal processing takes place (step 100). If the program does not require a valid card range, then a defined merchant verification value interchange is applied (step 96).

The steps shown in FIG. 4 may be performed by the one or more computational apparatuses in the payment processing system 26. The steps shown in FIG. 4 may be used in conjunction with the steps shown in FIG. 2 in any suitable combination, or order, without departing from the scope of the invention.

The present invention can be implemented in the form of control logic in software or hardware or a combination of both. The control logic may be stored in an information storage medium as a plurality of instructions adapted to direct an information processing device to perform a set of steps disclosed in embodiment of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
　receiving, by a server computer, an authorization request message including a merchant verification value, wherein the authorization request message is associated with a purchase by a consumer using a portable consumer device;
　determining a merchant-specific promotional program using the merchant verification value;
　performing the determined merchant-specific promotional program after receiving the authorization request message;
　receiving, by the server computer, an authorization response message from an issuer associated with the portable consumer device, wherein the authorization response message includes an authorization response code;

modifying, by the server computer, the authorization response message by replacing the authorization response code in the authorization response message with a promotions message, wherein the authorization response message provides response information indicating whether the consumer receives a reward; and sending the modified authorization response message to a terminal.

2. The method of claim 1 wherein the merchant-specific promotional program is a sweepstakes program.

3. The method of claim 1 wherein the merchant-specific promotional program is a rewards program.

4. The method of claim 1 wherein the response information indicates that the consumer has received a discount on the purchase.

5. The method of claim 1 wherein the response information indicates that the consumer will receive a discount on future purchases.

6. A server computer comprising a non-transitory computer readable medium comprising code, executable by a processor, for implementing a method comprising:

receiving an authorization request message including a merchant verification value, wherein the authorization request message is associated with a purchase by a consumer using a portable consumer device;

determining a merchant-specific promotional program using the merchant verification value;

performing the determined merchant-specific promotional program after receiving the authorization request message;

receiving an authorization response message from an issuer associated with the portable consumer device, wherein the authorization response message includes an authorization response code;

modifying the authorization response message by replacing the authorization response code in the authorization response message with a promotions message, wherein the authorization response message provides response information indicating whether the consumer receives a reward; and sending the modified authorization response message to a terminal.

7. A non-transitory computer readable medium comprising code, executable by a processor, for implementing a method comprising:

receiving an authorization request message including a merchant verification value, wherein the authorization request message is associated with a purchase by a consumer using a portable consumer device;

determining a merchant-specific promotional program using the merchant verification value;

performing the determined merchant-specific promotional program after receiving the authorization request message;

receiving an authorization response message from an issuer associated with the portable consumer device, wherein the authorization response message includes an authorization response code;

modifying the authorization response message by replacing the authorization response code in the authorization response message with a promotions message, wherein the authorization response message provides response information indicating whether the consumer receives a reward; and sending the modified authorization response message to a terminal.

8. The non-transitory computer readable medium of claim 7 wherein the merchant-specific promotional program is a sweepstakes program.

9. The non-transitory computer readable medium of claim 7 wherein the merchant-specific promotional program is a rewards program.

10. The non-transitory computer readable medium of claim 7 wherein the response information indicates that the consumer has received a discount on the purchase.

11. The non-transitory computer readable medium of claim 7 wherein the response information indicates that the consumer will receive a discount on future purchases.

12. A method comprising:

receiving an authorization request message, at a server computer, wherein the authorization request message is associated with a purchase by a consumer using a portable consumer device;

after receiving the authorization request message, determining if the consumer is a winner in a contest;

receiving a response message from an issuer associated with the portable consumer device, wherein the response message includes an authorization code field;

modifying, by the server computer, the response message by replacing the authorization code field in the response message with a promotions message, wherein the response message includes an indication of whether consumer is a winner; and sending the modified response message to a terminal.

13. The method of claim 12 wherein the indication of whether the consumer is a winner is printed on a credit or debit card receipt in an authorization field of the receipt.

14. A server computer comprising a non-transitory computer readable medium comprising code, executable by a processor, for implementing a method comprising:

receiving an authorization request message, wherein the authorization request message is associated with a purchase by a consumer using a portable consumer device;

after receiving the authorization request message, determining if the consumer is a winner in a contest;

after determining if the consumer is a winner, receiving a response message from an issuer associated with the portable consumer device, wherein the response message includes an authorization code field;

modifying the response message by replacing the authorization code field in the response message with a promotions message, wherein the authorization response message includes an indication of whether the consumer is a winner; and sending the modified response message to a terminal.

15. A non-transitory computer readable medium comprising code, executable by a processor, for implementing a method comprising:

receiving an authorization request message, wherein the authorization request message is associated with a purchase by a consumer using a portable consumer device;

determining if the consumer is a winner in a contest after receiving the authorization request message;

after determining if the consumer is a winner, receiving a response message from an issuer associated with the portable consumer device, wherein the response message includes an authorization code field;

modifying the response message by replacing the authorization code field in the response message with a promotions message that includes an indication of whether the consumer is a winner; and sending the modified response message to a terminal.

16. The non-transitory computer readable medium of claim 15 wherein the authorization request message includes a merchant verification value.

17. A method comprising:
sending an authorization request message including a merchant verification value to a server computer, wherein the authorization request message is associated with a purchase by a consumer using a portable consumer device, wherein the server computer comprises a processor, and a non-transitory computer readable medium coupled to the processor, the non-transitory computer readable medium comprising code, executable by a processor, for implementing a method comprising
receiving the authorization request message,
determining a merchant-specific promotional program using the merchant verification value,
performing the determined merchant-specific promotional program after receiving the authorization request message,
receiving an authorization response message from an issuer associated with the portable consumer device, wherein the authorization response message includes an authorization response code,
modifying the authorization response message by replacing the authorization response code in the authorization response message with promotion information, and
sending the modified authorization response message; and
receiving the modified authorization response message from the server computer.

18. The method of claim 17 wherein the promotion information includes information that the consumer is a winner in a sweepstakes.

19. The method of claim 17 wherein sending the authorization request message and receiving the authorization response message are performed by a terminal, and wherein the method further comprises printing, by the terminal, a receipt, wherein the promotion information is printed in an area where the authorization code is normally printed.

20. The method of claim 1 further comprising sending information regarding the consumer's winner status to the issuer after sending the modified authorization response message to the consumer.

21. The method of claim 1 wherein performing the determined merchant-specific promotional program after receiving the authorization request message includes determining what type of reward is to be provided to the consumer and updating consumer account records to account for the rewards.

* * * * *